United States Patent
Bortnikov et al.

(10) Patent No.: US 10,078,464 B2
(45) Date of Patent: Sep. 18, 2018

(54) CHOOSING A LEADER IN A REPLICATED MEMORY SYSTEM

(71) Applicant: International Business Machines Corporation, Armonk, NY (US)

(72) Inventors: Vita Bortnikov, Haifa (IL); David H. Carman, Austin, TX (US); Steven D. Clay, Round Rock, TX (US); Shlomit I. Shachor, Yokneam Eilit (IL); Ilya Shnayderman, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 15/212,274

(22) Filed: Jul. 17, 2016

(65) Prior Publication Data

US 2018/0018120 A1    Jan. 18, 2018

(51) Int. Cl.
*G06F 12/00* (2006.01)
*G06F 13/00* (2006.01)
*G06F 3/06* (2006.01)

(52) U.S. Cl.
CPC .......... *G06F 3/0634* (2013.01); *G06F 3/0604* (2013.01); *G06F 3/065* (2013.01); *G06F 3/067* (2013.01); *G06F 3/0617* (2013.01)

(58) Field of Classification Search
None
See application file for complete search history.

(56) References Cited

U.S. PATENT DOCUMENTS

| | | | | |
|---|---|---|---|---|
| 6,950,833 B2* | 9/2005 | Costello | ............. | G06F 11/2064 |
| 7,139,790 B1* | 11/2006 | Wang | ................... | H04B 3/542 370/216 |
| 7,392,302 B2* | 6/2008 | Halpern | ............... | G06F 9/4843 707/999.01 |
| 7,395,064 B2* | 7/2008 | Demirhan | ............ | H04W 28/18 455/434 |
| 7,532,585 B2* | 5/2009 | Kim | ....................... | H04L 29/06 370/254 |
| 7,644,092 B2* | 1/2010 | Sato | .................. | G06F 17/30117 707/823 |
| 7,814,058 B2* | 10/2010 | Beck | ................... | G06F 11/2064 707/649 |
| 7,831,779 B2* | 11/2010 | Holt | ........................ | G06F 9/52 711/100 |

(Continued)

OTHER PUBLICATIONS

Malkhi et al., "Omega Meets Paxos: Leader Election and Stability without Eventual Timely Links," DISC'05 Proceedings of the 19th international conference on Distributed Computing, Cracow, Poland, Sep. 2005, 15 pages.

*Primary Examiner* — Sean D Rossiter
(74) *Attorney, Agent, or Firm* — VanLeeuwen & VanLeeuwen; David B. Woycechowsky

(57) ABSTRACT

An approach is provided in which a replicated memory system replicates a set of data between multiple replicas, whereby each of the replicas includes a sequence update number corresponding to an update state of its respective set of data. At least one of the replicas identifies a number of replicas to which it connects and, in turn, the replicas select one of replicas as a leader replica based at least on the selected leader replica's sequence update number and the number of replicas to which the selected leader connects.

20 Claims, 8 Drawing Sheets

(56) References Cited

U.S. PATENT DOCUMENTS

| | | | | |
|---|---|---|---|---|
| 7,949,837 B2* | 5/2011 | Holt | .......................... | G06F 9/52 |
| | | | | 711/147 |
| 8,006,111 B1* | 8/2011 | Faibish | ................ | G06F 1/3221 |
| | | | | 713/324 |
| 8,959,227 B2* | 2/2015 | Chang | ............... | G06F 17/30227 |
| | | | | 707/615 |
| 9,230,000 B1* | 1/2016 | Hsieh | ................ | G06F 17/30575 |
| 9,280,591 B1 | 3/2016 | Kharatishvili et al. | | |
| 9,568,943 B1* | 2/2017 | Carman | ............... | G06F 11/1446 |
| 2005/0132154 A1* | 6/2005 | Rao | .................... | H04L 67/1097 |
| | | | | 711/162 |
| 2006/0120411 A1 | 6/2006 | Basu et al. | | |
| 2009/0006593 A1 | 1/2009 | Cortes | | |
| 2011/0238842 A1* | 9/2011 | Massa | ................. | G06F 11/1479 |
| | | | | 709/226 |
| 2012/0254412 A1* | 10/2012 | Goose | .................. | G06F 9/5072 |
| | | | | 709/224 |
| 2013/0019067 A1* | 1/2013 | Vilayannur | ............. | G06F 12/08 |
| | | | | 711/144 |
| 2016/0070593 A1* | 3/2016 | Harris | .................. | G06F 9/4843 |
| | | | | 718/106 |
| 2016/0077936 A1* | 3/2016 | Tang | ........................... | 714/4.11 |

* cited by examiner

400 ⤴

| Replica | Connected Replicas (incl. Self) | Connectivity Delay (constant = 1 sec) | Seq. # | Sequence Update Delay (constant = 10 ms) | Delay Time (Con. Delay + Seq. Delay) | Request Order |
|---|---|---|---|---|---|---|
| A | 3+1=4 | (6-4)*1 sec= 2 seconds | 103 | (108-103)*10ms= 50 ms | 2.05 seconds | 5 |
| B | 5+1=6 | (6-6)*1 sec= 0 seconds | 106 | (108-106)*10ms= 20 ms | .02 seconds | 1 |
| C | 3+1=4 | (6-4)*1= 2 seconds | 102 | (108-102)*10ms= 60 ms | 2.06 seconds | 6 |
| D | 4+1=5 | (6-5)*1= 1 second | 108 | (108-108)*10ms= 0 ms | 1.00 seconds | 3 |
| E | 4+1=5 | (6-5)*1= 1 second | 103 | (108-103)*10ms= 50 ms | 1.05 seconds | 4 |
| F | 5+1=6 | (6-6)*1= 0 seconds | 103 | (108-103)*10ms= 50 ms | .05 seconds | 2 |

*Fig. 4*

CHOOSING A LEADER IN A REPLICATED MEMORY SYSTEM

BACKGROUND

In a replicated memory system, such as a replicated cache system, several nodes, or replicas, replicate data between each other so that each node contains a copy of the same data in its respective memory. The replicated memory system selects a leader replica that acts as a gatekeeper for incoming data changes to ensure that the data in the replicated memory system does not become corrupt. The leader replica is typically pre-determined by a system administrator.

The leader replica also orchestrates a decision process among the replicas pertaining to memory updates so each of the replicas have a copy of the same set of data in its respective memory. Therefore, it is advantageous for the replicated memory system to select a leader replica that connects to as many of the other replicas as possible to ensure that memory updates from all replicas reach each of the other replicas. In some instances, however, a replicated memory system selects a leader replica that does not have the most recent data updates or may not connect to a substantial number of the other replicas.

BRIEF SUMMARY

According to one embodiment of the present disclosure, an approach is provided in which a replicated memory system replicates a set of data between multiple replicas, whereby each of the replicas includes a sequence update number corresponding to an update state of its respective set of data. At least one of the replicas identifies a number of replicas to which it connects and, in turn, the replicas select one of replicas as a leader replica based at least on the selected leader replica's sequence update number and the number of replicas to which the selected leader connects.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 4 is a diagram showing a table of computed new leader request delays for the replicas shown in FIG. 3;

DETAILED DESCRIPTION

Figure 1:
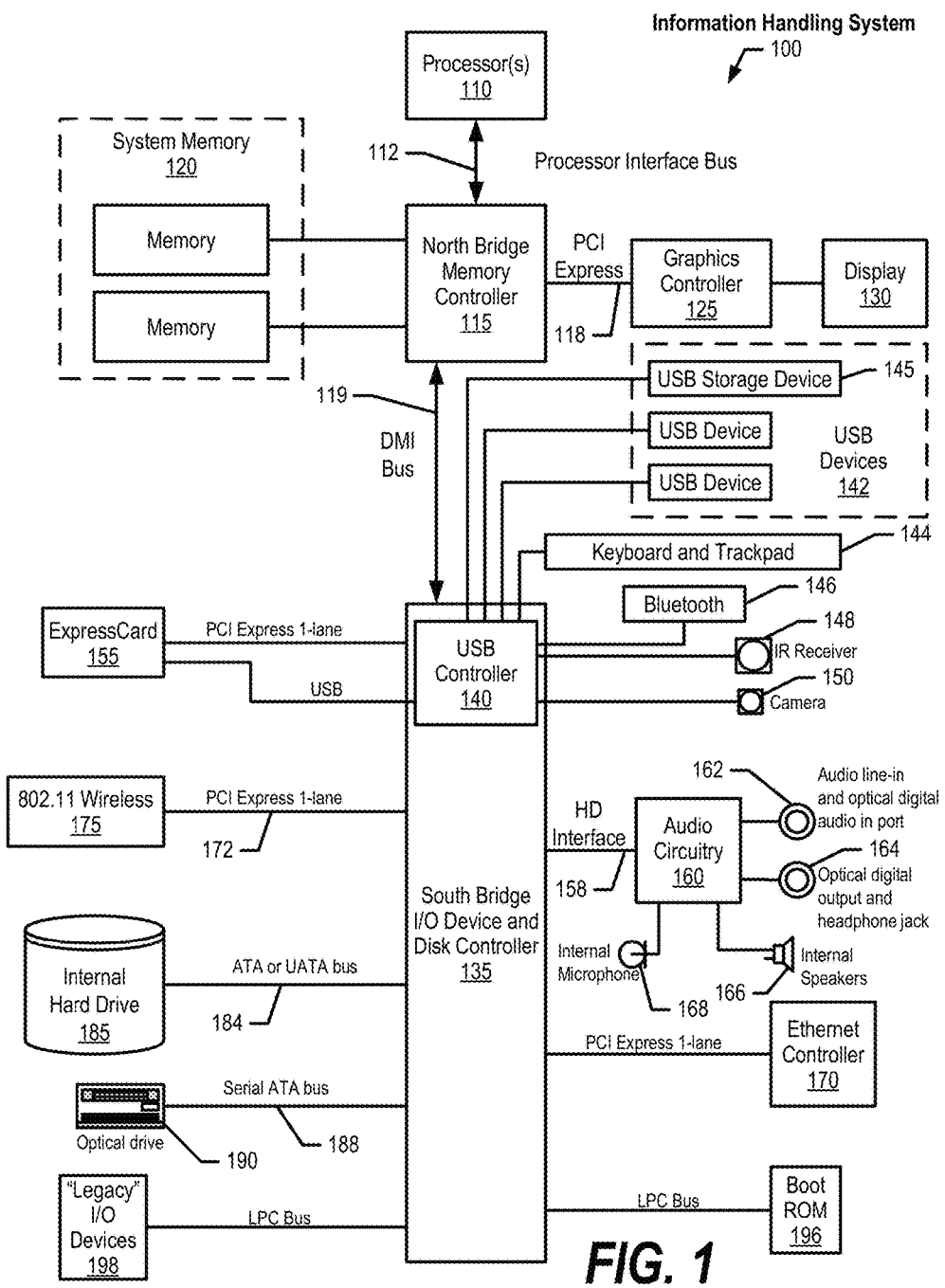
FIG. 1 illustrates an information handling system, which is a simplified example of a computer system capable of performing the computing operations described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to non-volatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 2:
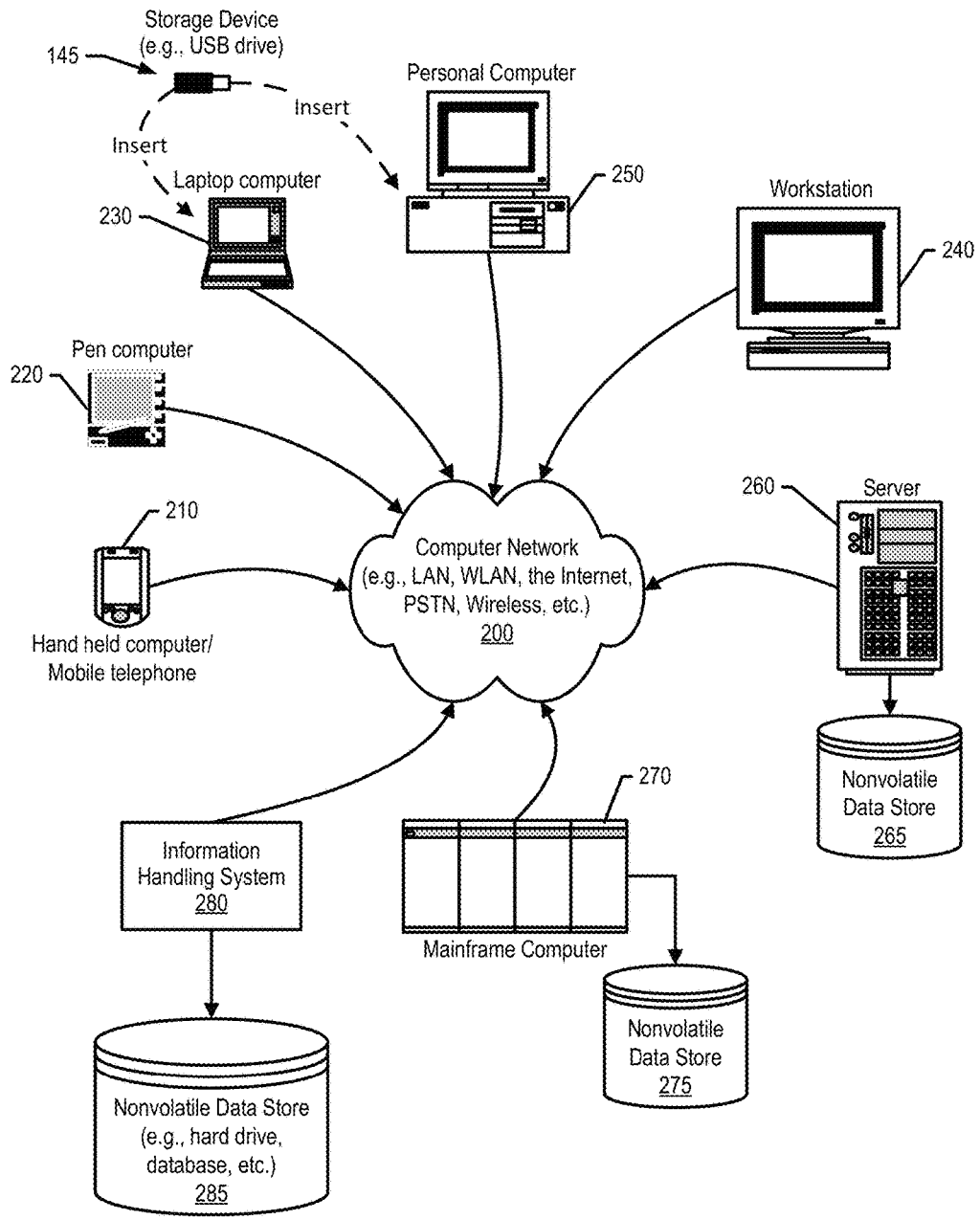
FIG. 2 provides an extension of the information handling system environment shown in FIG. 1 to illustrate that the methods described herein can be performed on a wide variety of information handling systems that operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 7 depict an approach of a replicated memory system that selects a leader replica from multiple replicas based upon an amount of replicas to which a replica is connected and a replica's sequence update number that corresponds to an update state of the replica's set of data. Each replica computes a new leader request delay based on its sequence update number and number of connected replicas. Then, each replica broadcasts a new leader request at a point in time corresponding to its respective new leader request delay. With high probability, the replica with the shortest new leader request delay is the first replica to request to become the new leader replica. In one embodiment, the number of connected replicas is weighted higher than the sequence update number. In this embodiment, a replica connected to more replicas may be chosen as a leader replica over a replica with a more recent update state with a lesser amount of connected replicas.

Some embodiments of the present invention may include one, or more, of the following operations, characteristics, features and/or advantages: (i) operating a cache and an associated plurality of replicas which respectively include replica caches that replicate the data stored in the cache on an on-going basis, with the operation of the cache including a plurality of time-ordered state changes to the cache and corresponding changes to the replica caches; (ii) determining that no replica cache of the plurality of replica caches has made more recent state changes than a proposed-leader replica cache; (iii) on at least condition that no replica cache of the plurality of replica caches has made more recent state changes than a potential-leader replica cache, selecting the potential-leader replica cache to act as leader of the plurality of replica caches; (iv) operating a cache and an associated plurality of replicas which respectively include replica caches that replicate the data stored in the cache on an on-going basis, with the operation of the cache including a plurality of time-ordered state changes to the cache and corresponding changes to the replica caches; (v) for each given replica cache of the plurality of replica caches, determining a respective delay time based, at least in part, on the following two factors: (a) a number of other replica caches that the given replica cache is connected to, and (b) recency of most recent state changes replicated in the given replica cache; (vi) selecting a replica cache of the plurality of replica caches to act as leader based, at least in part, upon delay time; (vii) dynamically choosing a leader using types of criteria discussed herein, in a way that is not pre-configured; (viii) algorithm that identifies the most updated and connected node for the purpose of leader election; and/or (ix) determining a new leader based on a criteria, or deciding factor, of recognizing a new leader is behind in its knowledge of the data state using a sequence number.

Figure 3:
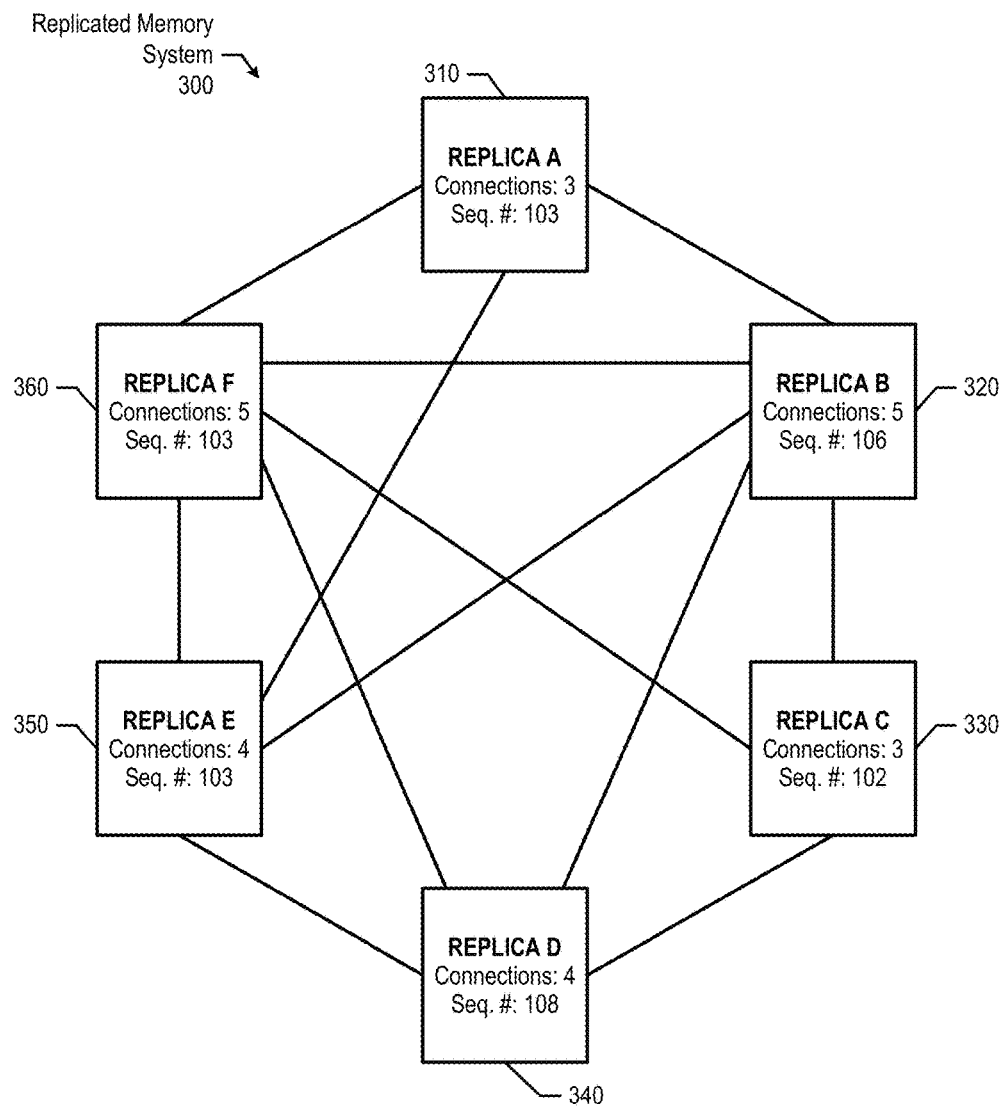
FIG. 3 is a diagram showing an example of a replicated memory system.

FIG. 3 is a diagram showing an example of a replicated memory system. Replicated memory system 300 includes replicas 310, 320, 330, 340, 350, and 360, each of which includes a storage area and executes a process to manage its respective storage area. As those skilled in the art can appreciate, replicated memory system 300 may have more or less replicas than what is shown in FIG. 3.

As described herein, each replica computes a new leader request delay based on the number of replicas to which it connects as well as its sequence update number. In turn, each replica transmits a new leader request to the other replicas at a point in time corresponding to its computed new leader request delay (see FIG. 5 and corresponding text for further details). As a result, the replica with the most amount of connected replicas and the most up-to-date memory is first to send out a new leader request and, with high probability, will be assigned as the new leader replica of replicated memory system 300.

In one embodiment, replicated memory system 300 sequentially numbers state updates to the memory. As a state update is received by a replica, that update is coordinated through the currently selected leader replica. The leader replica assigns a sequence update number to the update and distributes the update with corresponding sequence update number to each of the replicas, which each then records in its memory. A replica's knowledge of the state of the memory is then determined by the replica's latest sequence update number it has in its own memory. In this embodiment, the sequence update number that is known by each replica indicates the up-to-date knowledge of data of each replica. As the replicas communicate with one another, as part of their handshake at initial connection, they share their latest sequence update number. Each replica then compares its relative knowledge with all of the other replicas. If a replica is at or above the knowledge of the others, then its logic may propose itself to the others to become the leader. If its knowledge is less than the others, it will delay proposing itself as the leader to give other replicas with fresher data the opportunity to become leader.

A replica's ability to lead however, is not merely a matter of its up-to-date knowledge of data. A replica also needs connectivity to other replicas to be an effective leader replica. If the replica connects to many or most of the replicas, based on having received a connection handshakes from the other replicas, the replica will try to become the leader replica earlier than a replica that connects to fewer replicas. In one embodiment. a replica adds a time delay to become leader based upon the amount of other replicas to which the replica is not connected (see FIG. 4 and corresponding text for further details).

In another embodiment, one or more of the replicas may have functionality issues and might not propose themselves as leaders, even though they are more up to date. To ensure that replicated memory system 300 does not become inoperable with no leader replica, a less up-to-date replica and/or a replica with fewer connections to other replicas will propose itself as leader after its particular computed time delay to give priority to other, more qualified replicas (see FIG. 4 and corresponding text for further details).

Referring to FIG. 3, replica A 310 connects to three other replicas and has a sequence update number of 103. Meaning, replica A 310's memory has an update state corresponding to sequence update number 103. Replica B 320 connects to five other replicas and has a sequence update number of 106, which is three update states more than replica A 310. Replica C 330 connects to three other replicas and has a sequence update number of 102, which is four update states less than replica B 320. Replica D 340 connects to four other replicas and has a sequence update number of 108, which is the highest sequence update number in replicated memory system 300. Replica E 350 connects to four other replicas and has a sequence update number of 103. And, replica F 360 connects to five other replicas and has a sequence update number of 103.

As can be seen, replica D 340 has the highest sequence update number but is not connected to as many replicas as replica F 360 and replica B 320. To determine the most qualified leader replica, each replica computes its own new leader request delay based on its own sequence update number and the number of replicas to which it connects (see FIGS. 4, 7, and corresponding text for further details).

FIG. 4 is a diagram showing a table of computed new leader request delays for the replicas shown in FIG. 3. As discussed earlier, even though each replica computes its own new leader request delay, table 400 is presented for simplicity purposes to compare the differences between the different new leader request delays from the different replicas.

In one embodiment, the new leader request delay is the sum of two computations, which are a connectivity delay computation and a sequence update delay computation. The connectivity delay computation is based upon the number of connected replicas relative to the total number of replicas:

$$\text{Connectivity Delay} = (TR - (CR+1)) * CC$$

TR=Total number of replicas

CR=Number of connected replicas. "1" is added to CR to account for the replica performing the computations.

CC=Connectivity Constant. Set by an administrator based on the importance of connected replicas compared to a replica's sequence update number (see below).

Column 410 includes a list of replicas corresponding to those shown in FIG. 3. Column 420 includes the amount of connected replicas for each replica in column 410 incremented by one. Column 430 includes the computed connectivity delays for each of the replicas. The embodiment in FIG. 1 shows that the connectivity constant is one second. Replica's B and F have a zero second connectivity delay because they are connected to all of the other replicas, whereas replica's A and C have a two second connectivity delay because they are only connected to three of the other replicas.

The sequence update delay computations are based on a replica's sequence update number relative to the replicated memory system's highest sequence update number multiplied by a sequence update constant:

Sequence Update Delay=(HSUN−SUN)*SDC

HSUN=Highest sequence update number
SUN=Sequence update number of replica performing the computations
SDC=Sequence delay constant Column 440 includes sequence update numbers for their respective replicas shown in column 410. As can be seen, "108" is the highest sequence number from replica D. As such, all other replicas use 108 as the HSUN for computation purposes. The embodiment shown in FIG. 4 shows that the sequence delay constant is 10 milliseconds, which effectively places less weight on the sequence update number relative to the number of connected replicas discussed above.

Column 450 shows the sequence update delays for the replicas. Replica D has a 0 ms sequence update delay because replica D has the highest sequence update number. In contrast, replica C the highest sequence update delay of 60 ms because replica C has the lowest sequence update number of 102.

Column 460 shows the new leader request delays of the replicas, which are the sums of each replica's connectivity delay (column 430) and sequence update delay (column 450). Column 470 shows the relative order in which each replica will broadcast its corresponding new leader request. The first replica to broadcast its new leader request is replica B and the last replica to broadcast its new leader request is replica C (see FIG. 5 and corresponding text for further details).

Figure 5:
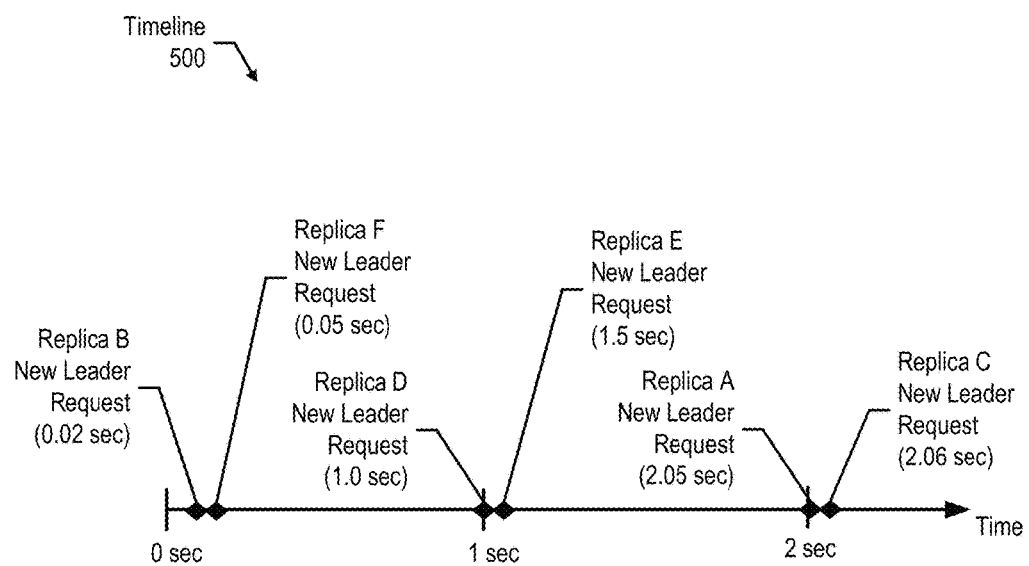
FIG. 5 is an example of a timeline showing new leader requests sent by replicas based upon their computed new leader request delays.

FIG. 5 is an example of a timeline showing relative times at which replicas send their respective new leader requests. FIG. 5 shows the new leader request delay times in column 470 of FIG. 4 mapped onto timeline 500. As can be seen, the order of the new leader requests start with replica B. If replica B does not receive enough yes votes from the other replicas to be leader or does not notify the other replicas of its new leader status in time, then replica F sends out a new leader request. If replica F does not receive enough yes votes from the other replicas to be leader, then replica D sends out a new leader request, followed by replica E, then replica A, and then replica C if all other replicas are not able to secure the leader replica status.

Figure 6:
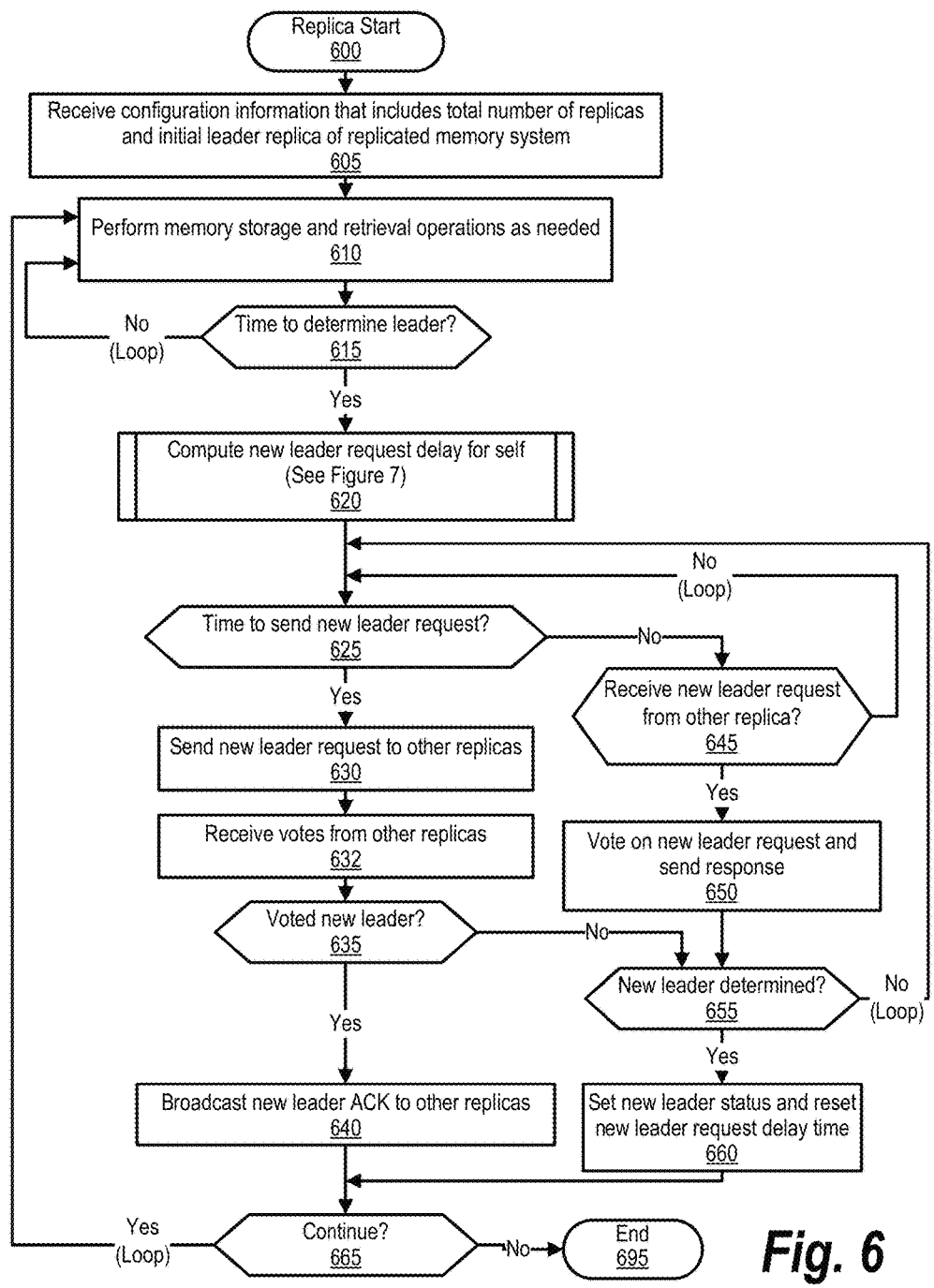
FIG. 6 is a flowchart showing steps taken by each replica to request to become a leader replica and vote on new leader requests received from other replicas.

FIG. 6 is a flowchart showing steps taken by each replica to request to become a leader replica and also vote on new leader requests received from other replicas. FIG. 6 processing commences at 600 whereupon, at step 605, a replica receives configuration information that includes a total number of replicas and initial leader information. In one embodiment, the configuration information is provided by the replicated memory system. At step 610, the replica performs memory storage and retrieval operations as needed, which includes logging the sequence update number corresponding to update states of its set of data.

The replica determines as to whether the leader replica is not operating and to initiate a new leader request (decision 615). This issue arises, for example, when the leader process has stopped and is no longer communicating with the other replicas or when a network disruption has occurred that leaves the leader replica unable to communicate with other replicas. If the current leader replica is functioning correctly and the replica determines there is no need to change leader replica, then decision 615 branches to the 'no' branch which loops back to continue performing memory storage and retrieval operations. This looping continues until the replica determines that a new leader replica should be chosen, at which point decision 615 branches to the 'yes' branch exiting the loop.

Figure 7:
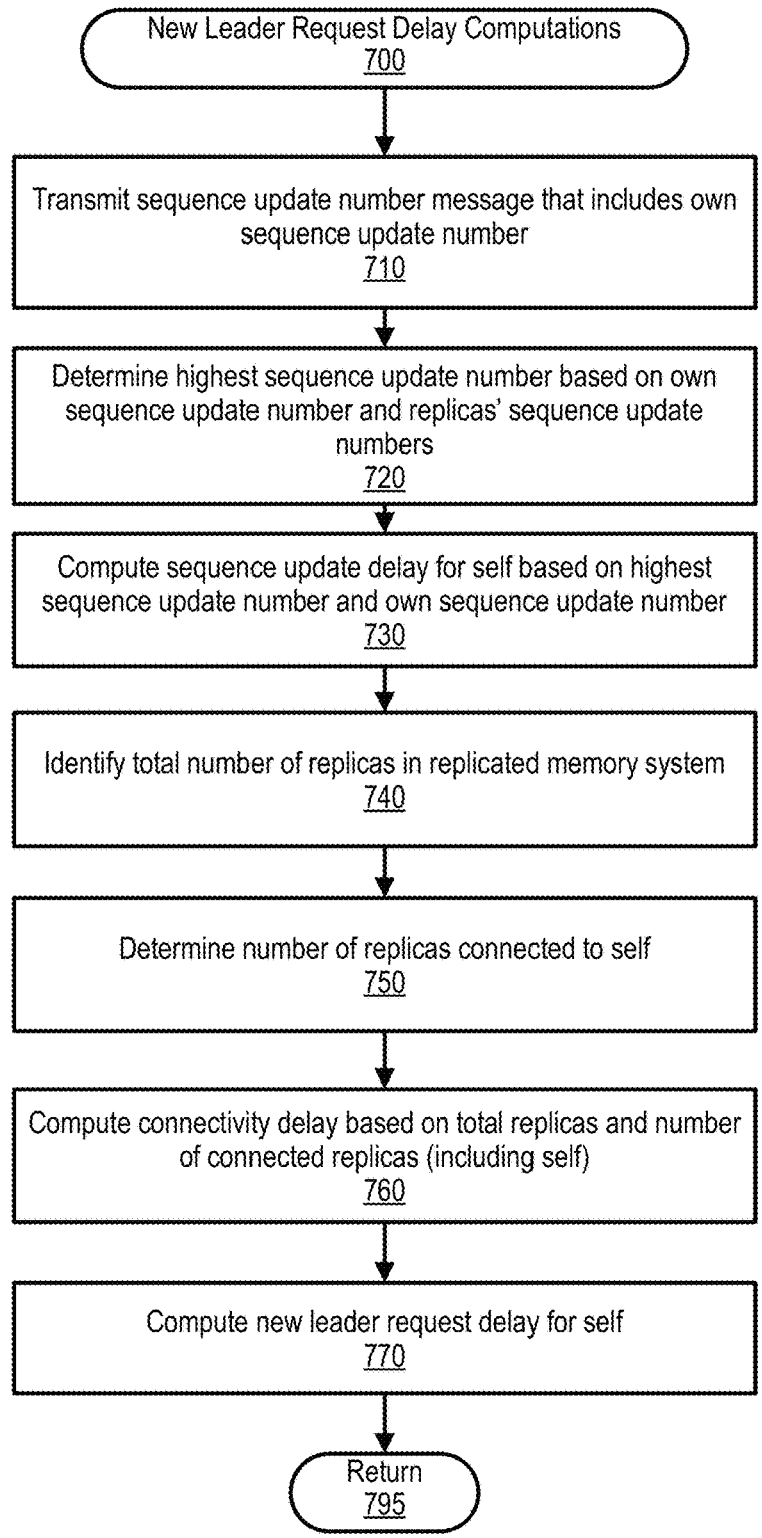
FIG. 7 is a flowchart showing steps taken by a replica to compute a new leader request delay based upon the replica's sequence update number and the number of connected replicas.

At predefined process 620, the replica computes a new leader request delay for itself (See FIG. 7 and corresponding text for further details). In one embodiment, each of the replicas computes its own new leader request delay at predefined process 620 when it detects that a new leader should be chosen.

The replica determines as to whether its new leader request delay has been reached (decision 625). If the replica's new leader request delay has been reached, then decision 625 branches to the 'yes' branch whereupon, at step 630, the replica sends its new leader request to the other replicas in the replicated memory system. At step 632, the replica receives votes from the other replicas that indicate a yes vote or a no vote (see FIG. 8 and corresponding text for further details). In one embodiment, replicas typically provide a 'yes' answer but may use heuristics to refuse obsolete requests. For example, leader request messages may carry a unique ID (ballot number) that increases with each attempt and a replica may vote 'no' if the replica has received previous attempts to become a leader with a higher unique ID.

The replica determines as to whether it received a quorum of yes votes (decision 635). If the replica received a quorum of yes votes, then decision 635 branches to the 'yes' branch whereupon, at step 640, the process broadcasts its new leader replica status to the other replicas. On the other hand, if the replica did not receive a quorum of the votes, then decision 635 branches to the 'no' branch.

Referring back to decision 625, if the replica determines that its new leader request delay has not yet been reached, then decision 625 branches to the 'no' branch whereupon the replica determines as to whether it received a new leader request from another replica (decision 645). For example, referring to FIG. 5, replica A's new leader request delay time is 2.05 seconds, which means that replica A will receive new leader requests from replica B, replica F, replica D, and replica E prior to replica A sending out a new leader request.

If the replica receives a new leader request from another replica, then decision 645 branches to the 'no' branch which loops back to wait its turn to send its new leader request or receive new leader requests from other replicas. When the replica receives a new leader request from another replica, decision 645 branches to the 'yes' branch whereupon the replica votes on the new leader request received from the other replica at step 650.

The replica determines as to whether one of the other replicas has been selected as the new leader replica after receiving a majority of yes votes from the other replicas (decision 655). If a new leader replica has been determined, then decision 655 branches to the 'yes' branch whereupon, at step 660, the replica logs the replica ID of the new leader replica. On the other hand, if the replica has not received a new leader acknowledgement message from one of the other replicas, decision 655 branches to the 'no' branch, which loops back to monitor new leader requests or wait for its turn to send its own new leader request.

The replica determines as to whether to continue processing messages (decision 665). If the replica should continue, then decision 665 branches to the 'yes' branch which loops back to perform memory storage and retrieval operations. This looping continues until the replica should terminate, such as for maintenance purposes, at which point decision 665 branches to the 'no' branch exiting the loop. FIG. 6 processing thereafter ends at 695.

FIG. 7 is a flowchart showing steps taken by a replica to compute a new leader request delay based upon the replica's sequence update number and the number of connected replicas. FIG. 7 processing commences at 700 whereupon, at step 710, the process transmits a sequence update number message that includes its own sequence update number (see FIG. 8 and corresponding text for further details). At step 720, the process determines a highest sequence update number based on its own sequence update number and the sequence update numbers shared by the other replicas. Referring to FIG. 3, the highest sequence number is "108" from replica D 340.

At step 730, the replica computes a sequence update delay based on the highest sequence update number and its own sequence update number using, in one embodiment, the formula discussed earlier of:

$$\text{Sequence Update Delay} = (\text{HSUN} - \text{SUN}) * \text{SDC}$$

At step 740, the replica identifies a total number of replicas in the replicated memory system (e.g., from configuration information) and, at step 750, the replica determines a number of replicas connected to itself based on, for example, the number of sequence update number messages received in step 710. At step 760, the replica computes a connectivity delay based on the total number of replicas and the number of connected replicas using, in one embodiment, the formula discussed earlier of:

$$\text{Connectivity Delay} = (\text{TR} - (\text{CR}+1)) * \text{CC}$$

At step 770, the process computes a new leader request delay by adding its connectivity delay to its sequence update delay. The replica then waits the new leader request delay before sending out a new leader request to the other replicas (see FIG. 6, step 630). FIG. 7 processing thereafter returns to the calling routine (see FIG. 6) at 795.

Figure 8:
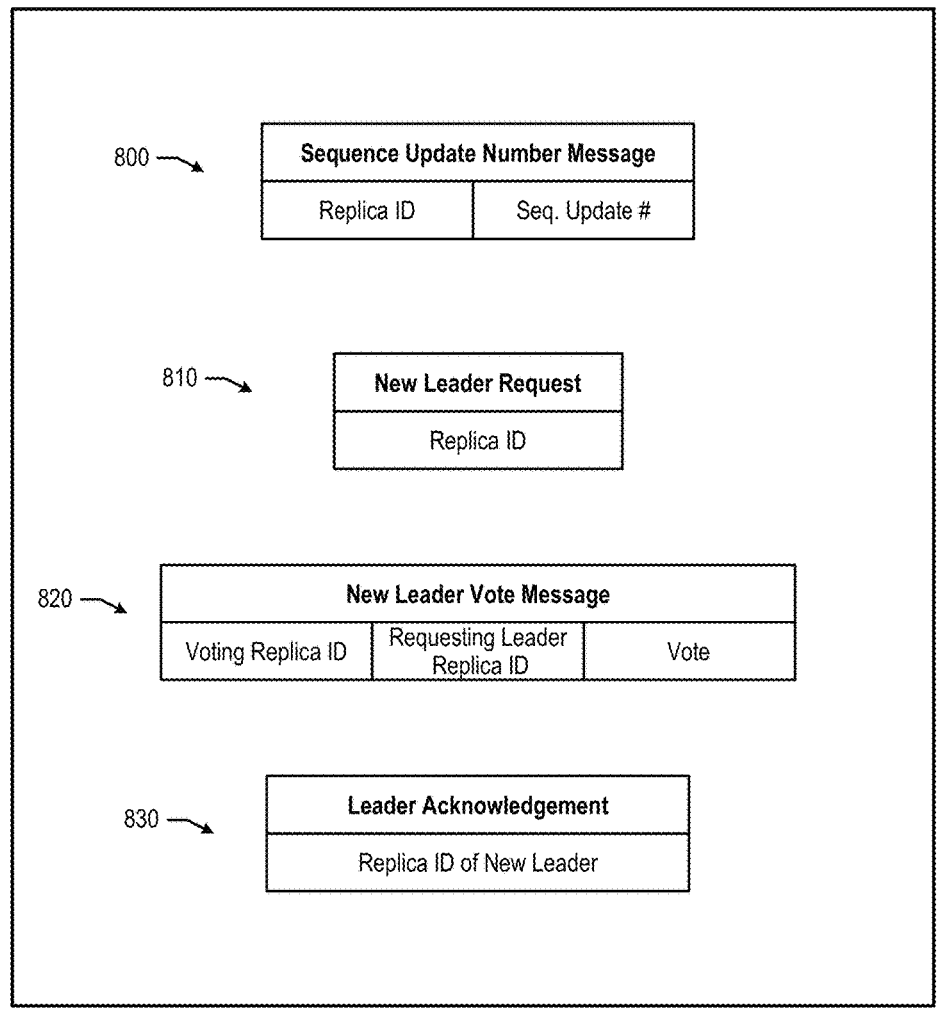
FIG. 8 is a diagram showing examples of messages sent between replicas in the replicated memory system.

FIG. 8 is a diagram showing examples of messages sent between replicas in the replicated memory system. Message 800 is an example of a sequence update number message that each replica broadcasts when each replica detects that the current leader replica is not functioning correctly. Each replica includes its replica ID and its sequence update number. As a result, each replica is able to determine the highest sequence number and compute its sequence update delay as described herein. In addition, each replica is able to determine the number of replicas to which it is connected based upon the number of sequence update number messages it receives.

Message 810 is a new leader request message that a replica broadcasts at its new leader request delay time. In one embodiment the leader request message includes an increasing unique ID ballot number, which the replicas use to decide about their vote and copy the unique ID ballot number to their reply message.

Message 820 is a new leader vote message that a replica sends to a requesting leader. Message 820 includes the voting replica ID (sending replica ID), the requesting leader's replica ID, and a vote such as "yes" or "no."

Message 830 is a leader acknowledgement message that a newly elected leader replica broadcasts to inform the other replicas. In one embodiment the unique ID ballot number is copied from the leader request message.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    operating a replicated memory system that replicates a set of data between each of a plurality of replicas, wherein each of the plurality of replicas includes a sequence update number corresponding to an update state of its respective set of data;
    identifying, by at least one of the plurality of replicas, a number of the plurality of replicas to which it connects; and
    selecting one of the plurality of replicas as a leader replica based at least on its sequence update number and the number of the plurality of replicas to which it connects.

2. The method of claim 1 further comprising:
    determining, by the at least one of the plurality of replicas, a new leader request delay based at least on its sequence update number and the number of the plurality of replicas to which it connects; and
    transmitting, by the at least one of the plurality of replicas, a new leader request to a set of the plurality of replicas at a point in time corresponding to the new leader request delay.

3. The method of claim 2 further comprising:
    estimating a highest sequence update number corresponding to a most recent update state of the set of data in at least one of the plurality of replicas;
    computing, by the at least one of the plurality of replicas, a sequence update delay based upon its respective sequence update number the estimated highest sequence update number; and
    utilizing the sequence update delay during the determining of the new leader request delay.

4. The method of claim 3 further comprising:
    determining a total number of replicas in the plurality of replicas;
    computing, by the at least one of the plurality of replicas, a connectivity delay based on the determined total number of replicas and the number of the plurality of replicas to which the at least one of the plurality of replicas connects; and
    utilizing the connectivity delay and the sequence update delay during the determining of the new leader request delay.

5. The method of claim 4 further comprising:
    utilizing a sequence delay constant during the computing of the sequence update delay; and utilizing a connectivity constant during the computing of the connectivity delay, wherein the connectivity constant has a higher weighting than the sequence delay constant during the determining of the new leader request delay.

6. The method of claim 2 further comprising:
receiving one or more leader vote messages from the set of the plurality of replicas in response to transmitting the new leader request;
determining, by the at least one of the plurality of replicas, to become a leader replica based on the received one or more leader vote messages; and
transmitting a new leader acknowledgment message to the set of the plurality of replicas that informs the set of the plurality of replicas that the selected replica is the leader replica.

7. The method of claim 1 wherein the replicated memory system is a distributed replicated cache system, and wherein each of the plurality of replicas include a cache that stores its respective set of data.

8. The method of claim 1 wherein the plurality of replicas determine the leader replica independent of an external administration selection.

9. An information handling system comprising:
one or more processors;
a memory coupled to at least one of the processors; and
a set of computer program instructions stored in the memory and executed by at least one of the processors in order to perform actions of:
operating a replicated memory system that replicates a set of data between each of a plurality of replicas, wherein each of the plurality of replicas includes a sequence update number corresponding to an update state of its respective set of data;
identifying, by at least one of the plurality of replicas, a number of the plurality of replicas to which it connects; and
selecting one of the plurality of replicas as a leader replica based at least on its sequence update number and the number of the plurality of replicas to which it connects.

10. The information handling system of claim 9 wherein at least one of the one or more processors perform additional actions comprising:
determining, by the at least one of the plurality of replicas, a new leader request delay based at least on its sequence update number and the number of the plurality of replicas to which it connects; and
transmitting, by the at least one of the plurality of replicas, a new leader request to a set of the plurality of replicas at a point in time corresponding to the new leader request delay.

11. The information handling system of claim 10 wherein at least one of the one or more processors perform additional actions comprising:
estimating a highest sequence update number corresponding to a most recent update state of the set of data in at least one of the plurality of replicas;
computing, by the at least one of the plurality of replicas, a sequence update delay based upon its respective sequence update number the estimated highest sequence update number; and
utilizing the sequence update delay during the determining of the new leader request delay.

12. The information handling system of claim 11 wherein at least one of the one or more processors perform additional actions comprising:
determining a total number of replicas in the plurality of replicas;
computing, by the at least one of the plurality of replicas, a connectivity delay based on the determined total number of replicas and the number of the plurality of replicas to which the at least one of the plurality of replicas connects; and
utilizing the connectivity delay and the sequence update delay during the determining of the new leader request delay.

13. The information handling system of claim 12 wherein at least one of the one or more processors perform additional actions comprising:
utilizing a sequence delay constant during the computing of the sequence update delay; and
utilizing a connectivity constant during the computing of the connectivity delay, wherein the connectivity constant has a higher weighting than the sequence delay constant during the determining of the new leader request delay.

14. The information handling system of claim 10 wherein at least one of the one or more processors perform additional actions comprising:
receiving one or more leader vote messages from the set of the plurality of replicas in response to transmitting the new leader request;
determining, by the at least one of the plurality of replicas, to become a leader replica based on the received one or more leader vote messages; and
transmitting a new leader acknowledgment message to the set of the plurality of replicas that informs the set of the plurality of replicas that the selected replica is the leader replica.

15. The information handling system of claim 9 wherein the plurality of replicas determine the leader replica independent of an external administration selection.

16. A computer program product stored in a computer readable storage medium, comprising computer program code that, when executed by an information handling system, causes the information handling system to perform actions comprising:
operating a replicated memory system that replicates a set of data between each of a plurality of replicas, wherein each of the plurality of replicas includes a sequence update number corresponding to an update state of its respective set of data;
identifying, by at least one of the plurality of replicas, a number of the plurality of replicas to which it connects; and
selecting one of the plurality of replicas as a leader replica based at least on its sequence update number and the number of the plurality of replicas to which it connects.

17. The computer program product of claim 16 wherein the information handling system performs additional actions comprising:
determining, by the at least one of the plurality of replicas, a new leader request delay based at least on its sequence update number and the number of the plurality of replicas to which it connects; and
transmitting, by the at least one of the plurality of replicas, a new leader request to a set of the plurality of replicas at a point in time corresponding to the new leader request delay.

18. The computer program product of claim 17 wherein the information handling system performs additional actions comprising:

estimating a highest sequence update number corresponding to a most recent update state of the set of data in at least one of the plurality of replicas;

computing, by the at least one of the plurality of replicas, a sequence update delay based upon its respective sequence update number the estimated highest sequence update number; and utilizing the sequence update delay during the determining of the new leader request delay.

19. The computer program product of claim 18 wherein the information handling system performs additional actions comprising:

determining a total number of replicas in the plurality of replicas;

computing, by the at least one of the plurality of replicas, a connectivity delay based on the determined total number of replicas and the number of the plurality of replicas to which the at least one of the plurality of replicas connects; and utilizing the connectivity delay and the sequence update delay during the determining of the new leader request delay.

20. The computer program product of claim 19 wherein the information handling system performs additional actions comprising:

utilizing a sequence delay constant during the computing of the sequence update delay; and utilizing a connectivity constant during the computing of the connectivity delay, wherein the connectivity constant has a higher weighting than the sequence delay constant during the determining of the new leader request delay.

* * * * *